DISCRIMINATORY CLR TRUNK

Filed April 3, 1957 2 Sheets-Sheet 1

INVENTOR.
CLARENCE E. LOMAX
BY C. R. Sipe
ATTY.

FIG. 2 CLR TRUNK 190
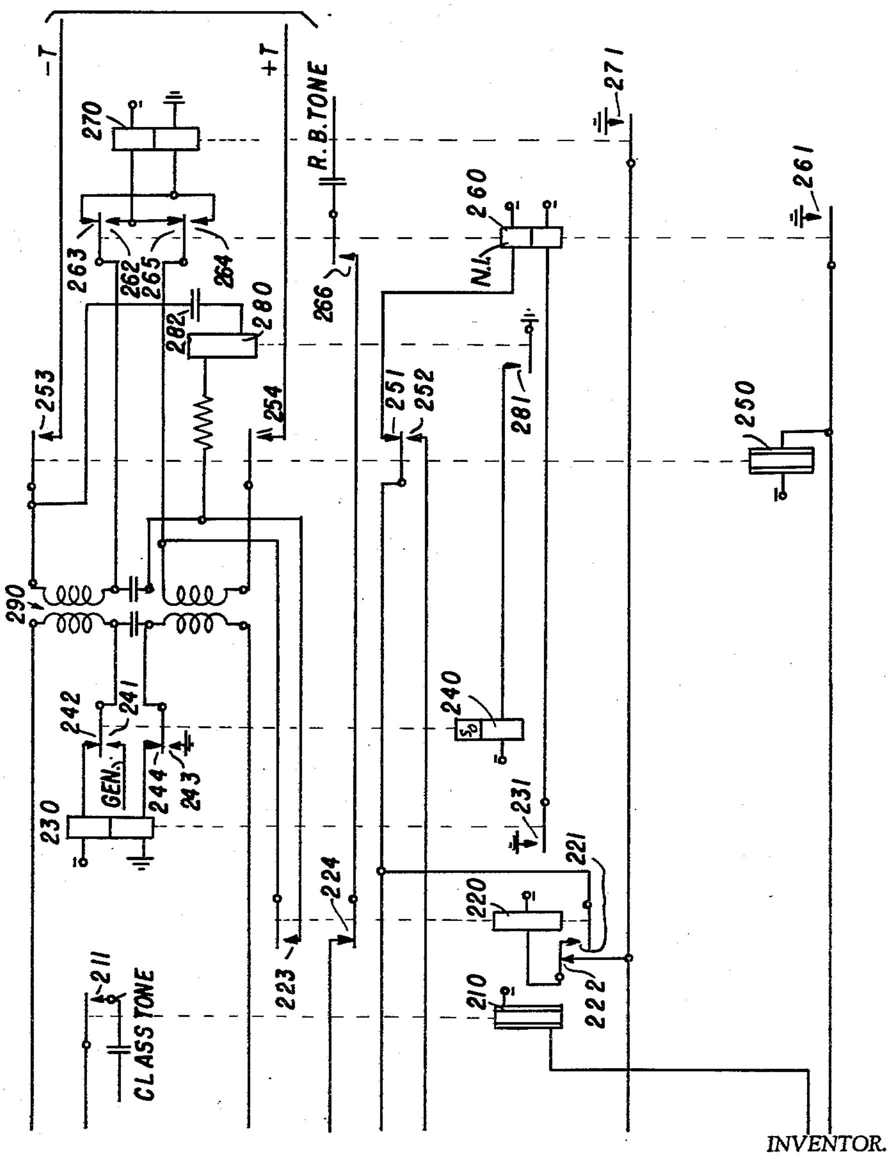
INVENTOR.
CLARENCE E. LOMAX
BY C. R. Sipe
ATTY

United States Patent Office 3,007,003

Patented Oct. 31, 1961

3,007,003

DISCRIMINATORY CLR TRUNK

Clarence E. Lomax, Hastings, Nebr., assignor to Automatic Electric Laboratories, Inc., a corporation of Delaware Filed Apr. 3, 1957, Ser. No. 650,347
6 Claims. (Cl. 179—6.3)

Figure 1:
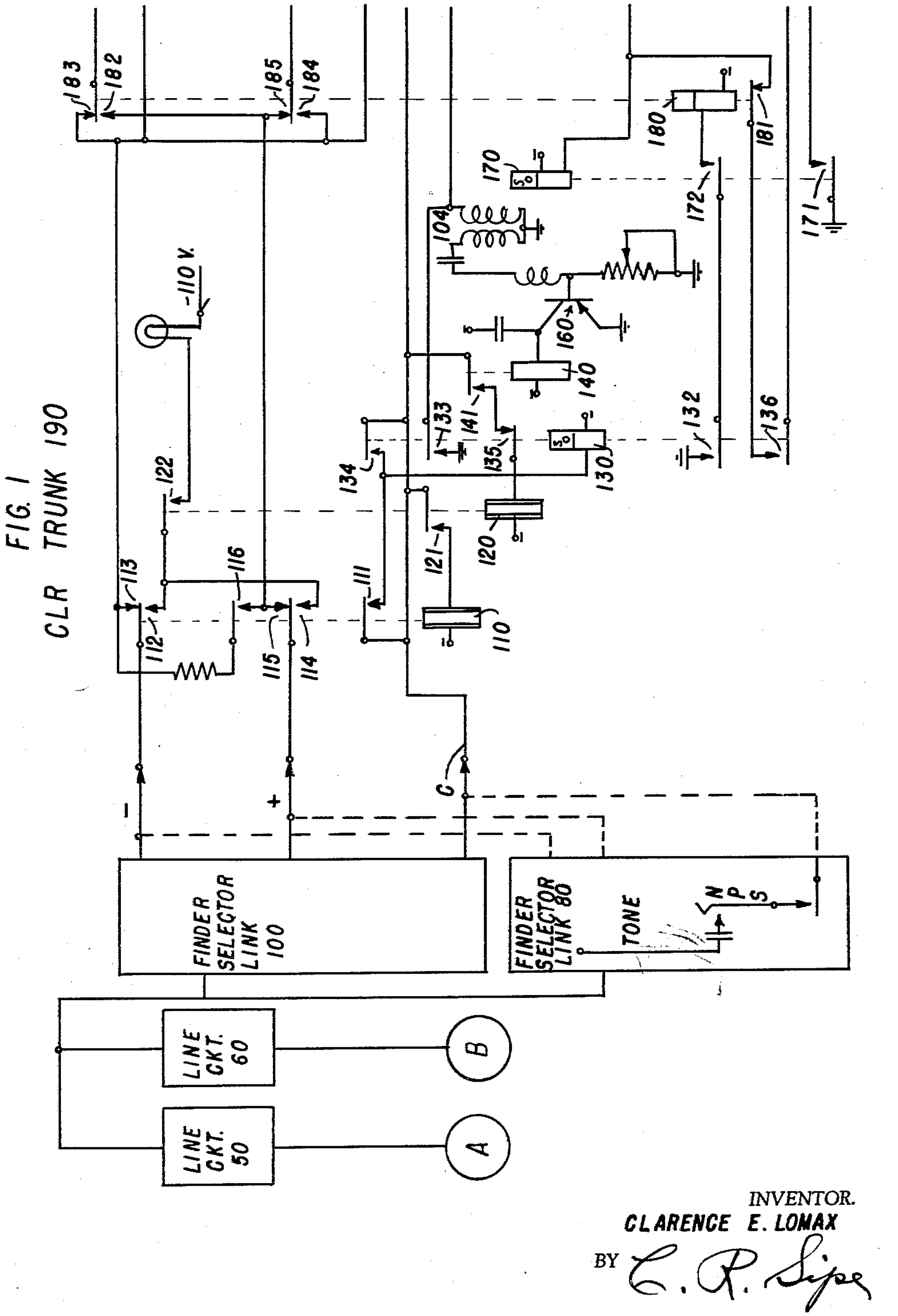

The present invention relates to a telephone system and more particularly relates to an arrangement for enabling a CLR trunk to discrimate between at least two classes of lines in order to provide services in accordance with the particular class of a calling line.

It is therefore an object of the present invention to provide a telephone system wherein a CLR trunk is used by both regular lines and paystation lines and wherein the conventional C lead is used for providing a discriminatory signal to the CLR trunk for enabling it to respond appropriately to calls from either a paystation or a regular line.

It is a further object of the present invention to provide this service in conjunction with a prepay postpay paystation otherwise known as local prepay wherein the paystation may be equipped with a coin control arrangement such as disclosed in U.S. Patent 2,905,763, issued September 22, 1959, to Hans Sengebusch. In the Sengebusch application a paystation coin control arrangement is disclosed wherein a collect magnet and a refund magnet are provided instead of the usual one magnet for both refund and collect operations. The collect magnet is operated by reverse battery on the line conductors and it then shunts itself, while causing the paystation coin apparatus to collect thereafter deposited coins by virtue of their deposit. The operation of the refund magnet places the paystation coin apparatus in its normal position and removes the collect magnet shunt.

A feature of this invention is the arrangement of a transistor circuit in the CLR trunk, which responds to the discriminating, or tone, signal provided over the conventional control, or C, conductor on calls from a paystation telephone line to the CLR trunk for controlling the application of various potentials to the line for operating the coin control apparatus at the paystation.

A further feature of this invention is the arrangement whereby the transistor circuit ensures that a refund potential is applied to the line conductors for controlling the refund magnet at the paystation to cause the refund of a deposited coin or coins and also ensures the application of reverse battery to the line conductors for the purpose of causing the operation of a collect magnet at the paystation for placing the paystation in a postpay condition so any coins deposited thereafter are collected by virtue of their deposit alone.

FIGURES 1 and 2 show an arrangement whereby either a paystation or a non-paystation line may be connected to a CLR trunk 190 and the circuits of a CLR trunk 190. The line circuit 50 associated with the paystation is arranged in any well-known manner to return a refund potential to the station for operating the refund magnet thereat on termination of a call. In one instance a finder selector link such as 100 is used for extending a connection from one of the calling lines to the CLR trunk and a tone signal is extended from the line circuit 50 of a calling paystation line through the finder-selector link 100, while in the alternative arrangement the finder-selector link 80 is used for extending a connection to the CLR trunk. In the alternative arrangement a paystation or paystations are connected to a particular level in the finder banks so that, when the finder switch is stepped to a paystation level or levels, a set of normal post springs close to the discriminating, or forward tone, signal through the subsequent equipment.

A subscriber at paystation A initiates a call in any well-known manner by lifting his handset and depositing the proper coin value. The finder-selector link 100 is operated to connect with the paystation line circuit 50 in a well known manner and the subscriber receives dial tone. After the proper deposit, the subscriber is permitted to operate his dial for stepping the selector switch of the finder selector link to a position corresponding to the first dialled digit. In this case it will be assumed that the subscriber is making a toll call and therefore dials the digit "0" to step the selector switch of the link to the CLR trunk level for extending a connection to a toll operator.

The line circuit 50 is arranged in any well-known manner to extend the discriminating, or tone, signal over the conventional control lead, which in turn is extended through the finder-selector link 100 and over the control wiper of the selector to the conductor marked C of the CLR trunk that is seized. In the event that it is desired to extend the tone from the finder switch of the finder selector link instead of from the line circuit, a finder-selector link such as 80 is employed. The finder switch of the link is arranged with normal post springs N.P.S., which close on the particular level or levels at which the paystations are connected in its banks. When the finder switch-through relay (not shown) is operated, a tone circuit prepared by springs N.P.S., if closed, cause a tone to be superimposed on the control conductor and extended towards the succeeding equipment.

The selector is a battery searching type and on being stepped to the CLR trunk level by the proper dial pulses, searches for an idle CLR trunk in a well-known manner by testing each C conductor of each trunk until it finds battery potential on one of the C conductors of the trunk such as 190. The test circuit extends from ground (not shown) in the selector, through the winding of the switch-through relay (not shown), over the C lead contacts 251 and through the upper non-conductive winding of relay 260 to battery. Only the switch-through relay (not shown) of the selector operates over this circuit.

The switch-through relay (not shown) of the selector operates as mentioned above and completes the extension of the loop circuit of calling paystation A to the battery and ground connected windings of line relay 230 in a well-known manner. Line relay 230 operates over this loop circuit and completes an obvious circuit for operating relay 260 over its lower winding at contacts 231. In operating, relay 260 closes contacts 262 and 264 to prepare a point in the application of reverse battery polarity to the out trunk conductors leading to the toll operator by way of the windings of relay 270, completes the connection of ring-back tone to the calling loops at contacts 266 and completes an obvious circuit for operating relay 250 at contacts 261. This ring-back tone is connected to the calling loop over a circuit extending by way of contacts 266, contacts 224, 113, the negative line conductor leading to the finder selector link 100 and over the calling loop to the subscriber at paystation A.

Relay 250 operates under control of relay 260, as explained, and closes contacts 253 and 254 to extend battery and ground from the respective upper and lower windings of relay 270 to leads −T to cause +T and the operator to be signalled in a well-known manner. At contacts 252 relay 250 extends the C lead to ground through the right winding of transformer 104 and disconnects the C lead from the upper winding of relay 260 at contact 251. The ground on the C lead from the right side of the transformer winding provides both a holding ground for the preceding switches and an operating ground for the CLR trunk.

The tone extended over the C lead in the event the call is from a paystation is induced in the secondary of the transformer 104 to control the transistor 160 accordingly. The transistor collector circuit swings toward ground potential thereby operating relay 140. Relay 140 closes contacts 141 to extend the ground from the right side of the transformer 104 through contacts 135 to operate slow-to-release relay 120.

Relay 120 closes contacts 121 to operate slow-to-release relay 110 from the operating ground on the C lead. In addition at contacts 122 relay 120 prepares a circuit for forwarding −110 volt potential to operate the refund magnet at the paystation. Relay 110 closes contacts 111 to extend its own operating ground to slow-to-operate relay 130. In the meantime at contacts 112 and 114 it extends the −110 volt potential from contacts 122 over the − and + selector switch wipers to operate the refund magnet at the calling paystation. The operated refund magnet causes the coin or coins on deposit to be refunded. Contacts 113 and 115 open, to open the loop to relay 230, however at contacts 116 a loop circuit to relay 230 remains completed.

Slow-to-operate relay 130 on operating closes contacts 133 to apply an alternate ground on the C lead to shunt the winding of transformer 104 so that the transistor 160 is no longer conductive and relay 140 restores. Contacts 134 complete a locking circuit for relay 130 from the ground on the C lead. At contacts 136 relay 130 prepares a point in the circuit to slow-to-release relay 210. At contacts 135 relay 130 opens the circuit to relay 120, which restores after a period of time to open the circuit to relay 110 at contacts 121. Contacts 122 do not open, until relay 120 is restored, thereby providing a refund potential to the line conductors for a time period sufficient to ensure full operation of the refund magnet at the paystation. Relay 110 restores after a period of time to open contacts 111 thereby opening the original operating circuit for relay 130, while restoring the original loop circuit to relay 230 at contacts 113 and 115.

The operator on answering completes an operating circuit for relay 270, with the circuit including the upper and lower windings of relay 270 and the −T and +T conductors. Relay 270 operates to close contacts 271 for completing a circuit extending from ground thereat, over contacts 181, 136 and through relay 210 to battery. Relay 210 on operating closes contact 211 to provide a paystation class of service tone or signal to repeating coil 290, with this tone being induced in the right winding of the coil, to signal the operator over the +T and −T conductors.

The ground from contacts 271 is also forwarded directly to slow-to-operate relay 170. It operates after a period of time and closes contacts 171 and 172. At contacts 171 an alternate circuit is completed to relay 250 and at contacts 172 ground from contacts 132 energizes slow-to-operate relay 180. Relay 180 eventually operates and opens contacts 181 to restore slow-to-release relay 210, which upon restoring removes the paystation class of service tone at contacts 211. It will be noted that the ground from contacts 271 also operates relay 220 by way of contacts 222. Relay 220 opens its energizing circuit at contacts 222 and locks operated over contacts 221 to ground on the C lead. At contacts 224 it terminates the ring back signal to the calling party, and at contacts 223 it connects both relay 280 and its series connected condenser 282 in series with the lower right winding of coil 290.

Relay 180 also opens contacts 183 and 185 and closes contacts 182 and 184 to thereby reverse the application of battery and ground potential by way of the windings of relay 230 to the line conductors of the calling loop. This reversal of battery operates the collect magnet at the calling paystation to effectively operate the apparatus thereat into a collect position in a well-known manner, after which it is shunted from the line. The operator on conversing with the calling party requires the deposit of one or more coins before completing the call. These coins are collected by virtue of their deposit alone due to the above described operation of the collect magnet, and the operator thereafter completes the call.

In the event of a call from a regular station or non-paystation line such as B using line circuit 60, relays 230, 260 and 250 are operated in the same manner as previously described, when the call is extended. The operator is then signalled in a manner explained. Relay 270 is operated to in turn operate relays 170 and 220 as explained, on answer by the operator. As a tone signal is not forwarded over the C lead from the link associated with the calling subscriber, relay 140 remains unoperated. The operator on answering receives no paystation class of service tone, as relay 210 has not operated. She then handles the call accordingly.

In the event the calling party hangs up, the loop circuit to relay 230 is opened and it restores. Contacts 231 open to restore relay 260. Relay 260 opens one circuit for relay 250 at contacts 261, however, relay 250 remains operated from ground at contacts 171, until the operator removes her plug, as will be explained. If the operator needs to ring the calling party back, she connects a momentary generator ground and battery to the −T and the +T conductors respectively, to operate relay 280. At contacts 281, relay 280 operates relay 240, which operates. Relay 240 connects generator ground at contacts 241 and generator battery to the calling party's line loop so that the subscriber's ringer is operated to signal him. With the momentary generator potentials removed from leads +T and −T, relay 280 restores to open contacts 281. This releases relay 240 to terminate the ringing signal. The calling party coming back on the line reoperates relays 230 and 260.

As mentioned above, when the calling party releases the connection, relay 230 restores to in turn restore relay 260. When the operator disconnects, she restores relay 270 to open contacts 271. This restores relay 170. With relays 170 and 260 released, relay 250 restores to disconnect ground from the C lead at contacts 252. This causes the restoration of the preceding equipment in any well-known manner. If relay 130 is operated as a result of a call from a paystation, the removal of ground from lead C causes it to restore, while relay 180 restores when contacts 172 open. The restoration of the switches removes the ground from the conventional control lead extending back to the line circuits. In the event line circuit 50 was involved in the call this causes a temporary refund potential to be returned in any well-known manner to the paystation for operating the refund magnet at the station to reset the coin apparatus at the paystation from the collect position to its normal position.

Thus having described one embodiment of my invention, I am appending hereto a series of claims which I believe to encompass the inventive concept incorporated herein.

What is claimed is:

1. An operator's trunk circuit for use with a prepay postpay paystation connected to said trunk circuit over a pair of talking conductors and a control conductor having a tone signal impressed thereon, said paystation having a coin magnet for controlling a coin deposit thereat, the improvement comprising means operated in response to said tone signal for returning a potential over said talking conductors to control a coin magnet at said station and thereby refund a coin on deposit at said station, and means operated on answer of the operator at said trunk circuit if said tone responsive means was operated for returning a potential over said talking conductors to control another coin magnet at said station and thereby place said station in a postpay condition.

2. An arrangement such as claimed in claim 1, in which said tone operated means comprises a transistor circuit rendered effective only in response to said tone signal.

3. In an arrangement such as claimed in claim 1, means effective after operation of said tone operated means for disabling said tone signal.

4. In a telephone system wherein a prepay-postpay paystation having coin disposal means and normally in said prepay condition operates switching apparatus in response to the initiation of a call thereby over a paystation line for seizing an operator trunk circuit over a connection comprising a pair of line conductors and a control conductor and wherein a discriminating tone signal indicative of only a calling paystation line is applied to said control conductor of said connection by said switching apparatus for transmission to said operator trunk, the combination therewith of tone responding means in said trunk circuit, relay means in said trunk circuit operated in response to said seizure for connecting said control conductor to said tone responding means, said tone responding means operated in response to receipt of said discriminating tone signal over said control conductor, a source of special potential in said trunk circuit, and control means operated in response to said operation of said tone responding means for applying said special potential to said line conductors of said connection for operating certain of said coin disposal means to initiate a coin refund operation at said calling paystation.

5. A telephone system such as claimed in claim 4, including release means in said trunk circuit operated in response to said operation of said control means for restoring said control means to normal, whereby said special potential is removed from said line conductors of said connection.

6. A telephone system such as claimed in claim 4, including means in said trunk circuit operated in response to said seizure for signalling an operator, means in said trunk circuit for applying a potential of different polarity to each said line conductor of said connection at the time of said seizure of said trunk circuit, and means in said trunk circuit operated in response to the answering of said signal by said operator for reversing the application of said different polarities of said potential to said line conductors for operating other of said coin disposal means to initiate a coin collect operation at said calling paystation and thereby place said paystation in a postpay condition.

References Cited in the file of this patent

UNITED STATES PATENTS

| | | |
|---|---|---|
| 1,616,402 | Wicks | Feb. 1, 1927 |
| 1,792,452 | Tharp et al. | Feb. 10, 1931 |
| 2,819,343 | Faulkner | Jan. 7, 1958 |
| 2,846,507 | Sandalis et al. | Aug. 5, 1958 |
| 2,910,537 | Lomax | Oct. 27, 1959 |